United States Patent [19]

Ammann et al.

[11] Patent Number: 4,825,803

[45] Date of Patent: May 2, 1989

[54] SLIDABLE RATING DISPLAY FOR GAMES

[76] Inventors: Michael B. Ammann, 1612 Poincare Bend, Virginia Beach, Va. 23454; Steven S. Delicati, 286 Overlook Dr., East Islip, N.Y. 11730

[21] Appl. No.: 140,213

[22] Filed: Dec. 31, 1987

[51] Int. Cl.[4] ...................... G01D 11/24; G09F 03/20

[52] U.S. Cl. ...................................... 116/324; 40/375; 116/225

[58] Field of Search ............... 116/321, 323, 324, 225, 116/215; 40/359, 654

[56] References Cited

U.S. PATENT DOCUMENTS

| | | | |
|---|---|---|---|
| 381,425 | 4/1888 | Rosenwasser et al. | 116/225 X |
| 2,502,190 | 3/1950 | Wassell | 40/360 X |
| 3,204,639 | 9/1965 | Kleffman | 40/360 |
| 3,686,938 | 8/1972 | Binckley | 116/28 RX |
| 4,166,673 | 9/1979 | Dona | 116/323 X |
| 4,227,613 | 10/1980 | Seitz | 116/321 |
| 4,712,504 | 12/1987 | Zarley et al. | 116/323 |
| 4,738,449 | 4/1988 | Droz | 116/225 X |

FOREIGN PATENT DOCUMENTS

| | | | |
|---|---|---|---|
| 0003349 | 1/1979 | Fed. Rep. of Germany . | |
| 0010546 | of 1911 | United Kingdom | 116/324 |

*Primary Examiner*—Daniel M. Yasich

*Attorney, Agent, or Firm*—Leonard Belkin

[57] ABSTRACT

Apparatus for displaying information from the inside of a vehicle consisting of a pair of horizontal members attached to end brackets mounted on the inside of a window in the vehicle utilizing suction. The upper member is removable and reversible. The lower member is provided with a slide to identify a particular bit of information, with a tooth on the slide and notches on the lower member to keep the slide in place and to highlight a preselected bit of information.

4 Claims, 1 Drawing Sheet

SLIDABLE RATING DISPLAY FOR GAMES

BACKGROUND OF THE INVENTION

This invention relates to a portable display device for use in advertising, promotional activities, games and the like, and more particularly to a portable display device for mounting on the inside of windows and including a variety of features.

There are a large number of display devices such as signs which are available and incorporating a host of features making them applicable for use in particular situations.

Display devices which are designed to be portable usually comprise complicated supporting arrangements which make them difficult to put in place or remove with the result that they are quite often inconvenient to use.

In addition, if the display device is being used as part of a game the usual supporting arrangements complicate such use. In addition, such devices do not usually contain certain specialized features which are particularly useful in some game playing situations. An example of one such device is shown in Pat. No. 0,003,349 issued by the European Patent Office.

SUMMARY OF THE INVENTION

The present invention concerns display apparatus suitable for use in advertising, playing games, engaging in promotional efforts, and generally conveying information to one or more persons located at a distance.

In accordance with a preferred embodiment of this invention there is provided a pair of spaced holding brackets each having a suction cup for removably mounting the device on a wall or other surface such as a glass window, and a pair of vertically spaced horizontally extending members joining the brackets at their ends. The horizontally extending members are removably attached to the brackets and are reversible so that different information can be displaced on both sides while one or more slidable members may be provided to highlight specific information or to superimpose additional information.

It is thus a principal object of this invention to provide display apparatus readily mountable and removable capable of carrying a variety of information which may be rearranged or highlighted in a convenient manner.

Other objects and advantages of this invention will hereinafter become obvious from the following detailed description of a preferred embodiment of this invention.

DETAILED DESCRIPTION OF THE PREFERRED EMBODIMENT

Figure 1:
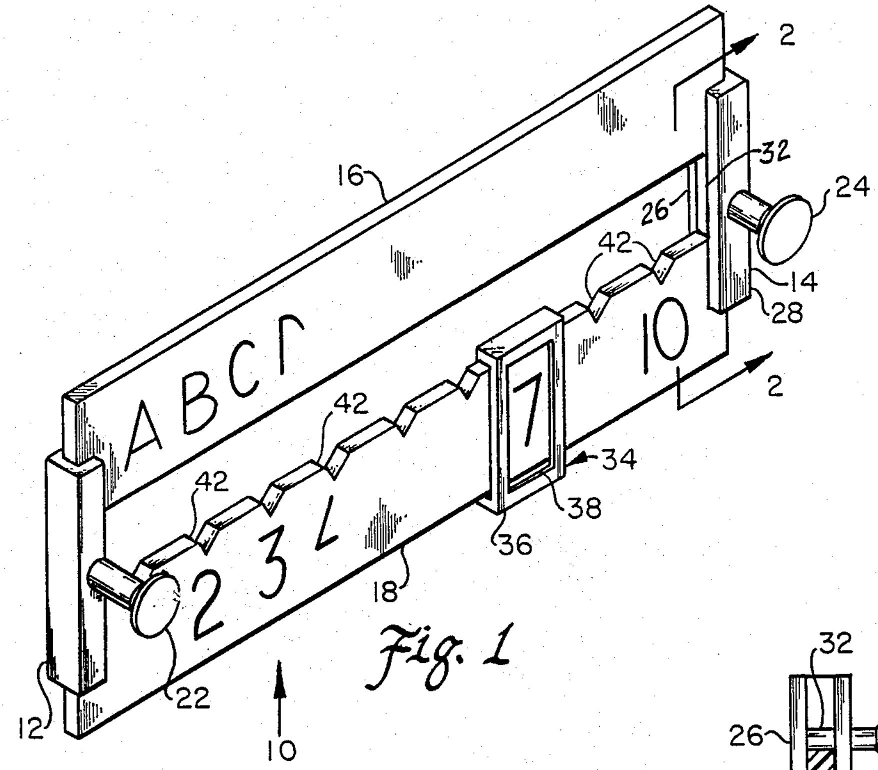
FIG. 1 is an isometric view of a preferred embodiment of this invention.

Referring to FIG. 1 there is illustrated display apparatus 10 consisting of a pair of spaced end brackets 12 and 14 which are identical to, but a mirror image of, each other.

Extending between and supported by brackets 12 and 14 are a pair of flat, horizontally arranged, upper an lower members 16 and 18. Lower member 18 is permanently attached to brackets 12 and 14, while as will be seen from the discussion below, upper member 16 is removable and reversible.

Bracket members 12 and 14 are provided respectively with a pair of suction cups 22 and 24 extending horizontally outwardly, for a purpose to be described.

Figure 2:
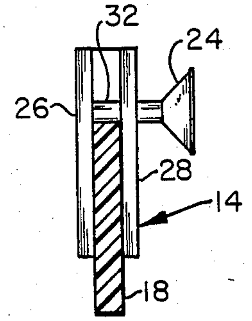
FIG. 2 is a view along 2—2 of FIG. 1 with top member removed.

For details of brackets 12 and 14, reference is made to FIG. 2 wherein bracket 14 is shown with horizontal member 18 in place and member 16 removed. Bracket 14 consists of a pair of elongated side plates 26 and 28 joined by a spacer block 32 which in effect separates members 16 and 18 as seen in FIG. 1.

Referring to FIG. 1 it will be noted that mounted on lower member 18 is a slide 34 which is in the shape of a frame 36 having an opening 38 so that information on the face of member 18 is highlighted. The information displayed on this surface of member 18 is in discrete form, that is, consisting of a series of spaced numbers, as illustrated, or it can be letters, pictures, sketches, etc. In any event, the particular bit of information to be highlighted is identified by moving slide 36 so that opening 38 permits viewing of that information.

Figure 3:
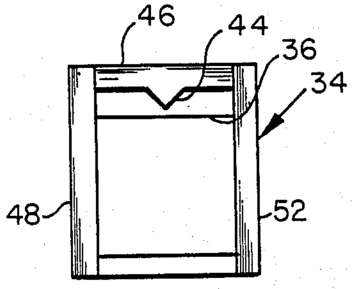
FIG. 3 is a rear elevation view of the slide shown in FIG. 1.

It will be noted that the top edge of lower member 18 is provided with a plurality of spaced notches 42, each one of which is at a location just above a bit of information. As seen in FIG. 3, the back of slide 34 is provided with a tooth 44 for engagement with any one of the notches 42. Tooth 44 is mounted on a cross member 46 attached to two side members 48 and 52 which is on the back side of slide 34, and is not visible when apparatus 10 is viewed through a glass window.

Upper member 16, as already noted, is removable and reversible. Member 16 would contain information or questions requiring a response, and lower member 18 would contain answers or responses which would be identified by moving slide 34.

Figure 4:
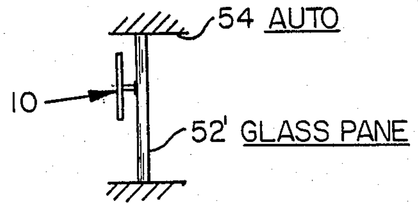
FIG. 4 is a side view, in partially schematic form, showing the device of FIG. 1 mounted on a window.

As seen in FIG. 4, apparatus 10, in use, may be mounted on the inside of a glass pane 52' of an automobile 54. The information on upper member 16 would be facing outwardly, for viewing through the window, and slide 34 could be used in conjunction with or in response to the information on member 16. The latter, as already noted, can be reversed in order to make use of information on the other side.

Apparatus 10 as described can be utilized as a promotional or advertising vehicle, or as part of a game which the occupant of the vehicle can play with someone in another vehicle or a pedestrian, or can be employed on the inside of a window such as a store window for advertising or displaying information.

While only a preferred embodiment of the invention has been described, it is understood that many variations are possible without departing from the principles of this invention as defined in the claims which follow.

What is claimed is:

1. Apparatus for displaying information through and in combination with a transparent window comprising first and second upper and lower extended flat members, bracket means at the ends of said members for supporting said members, said first member being removable from said bracket means in order to permit said first member to be reversed, the lower extended member being fixed to said bracket means, and said bracket means having a spacer block to support by gravity the upper extended member, means comprising suction cups on said bracket means for attaching said apparatus to said window so that said information faces said window for viewing from the other side of said window, said lower member being provided with a plurality of spaced notches, each of said notches identifying the location of a bit of information, slide means riding on said lower member having a tooth for the engagement of one of said notches to identify a selected bit of information, and said slide means having an opening to view said information.

2. The apparatus of claim 1 in which said first member is reversible.

3. The apparatus of claim 2 in which said second member is permanently attached to said brackets.

4. The apparatus of claim 3 in which said slide means comprises a rectangular frame for sliding on said lower member, said tooth being located on said frame on the side opposite said suction cups so as not to be visible through said window.

* * * * *